United States Patent Office 2,915,505
Patented Dec. 1, 1959

2,915,505

CONDENSATION POLYMERS OF 4-HYDROXY-PIPERIDINE

Franklin Howard Koontz and John Raymond Schaefgen, Wilmington, Del., assignors to E. I. du Pont de Nemours and Company, Wilmington, Del., a corporation of Delaware No Drawing. Application May 22, 1957
Serial No. 660,778

2 Claims. (Cl. 260—77.5)

This invention relates to a novel and useful polymer and to a process for its preparation. More specifically it is concerned with the preparation of a polyurethane from a hydroxy substituted piperidine as defined more completely hereinafter.

It is an object of the present invention to provide a high molecular weight polyurethane from a hydroxy substituted piperidine as defined more completely hereinafter.

Another object is to provide a process for the preparation of a polyurethane from a hydroxy substituted piperidine.

These and other objects will become apparent in the course of the following specification and claims.

The polyurethanes of the present invention have particular utility in the formation of shaped structures such as films, fibers, filaments and molded articles.

In accordance with the present invention a polymer is provided having the repeating unit

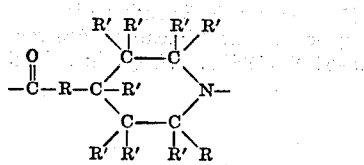

wherein —R— is a radical of the class consisting of —O— and —O-lower alkylene- and —R' is a radical of the class consisting of —H and -lower alkyl. Such a polymer is formed by contacting a solution of the amine salt of the chloroformate of the corresponding hydroxy substituted piperidine with an acid acceptor. To avoid undue hydrolysis of the chloroformate group it is preferred to suspend or dissolve the amine salt in a water immiscible medium and thereafter contact the composition with an aqueous solution of an acid acceptor, the polymer precipitating from the resulting emulsion.

The following examples are cited to illustrate the invention. They are not intended to limit it in any way. By "polymer melt temperature" as reported herein is meant the minimum temperature at which a sample of the polymer leaves a wet, molten trail as it is stroked with moderate pressure over a heated block.

Example I 27 parts of 4-(3-hydroxypropyl)-pyridine in a solution of 30 parts of water and 160 parts of acetic acid is hydrogenated employing 0.7 part of platinum oxide as catalyst, a pressure of 50 p.s.i., at a temperature of 30° C. for a period of 27 hours. The catalyst is removed, and the acetic acid is then distilled off and a yield of 84% product with a boiling point of 125–130° C. at 0.5 mm. mercury pressure is obtained. The para-toluene sulfonate salt is prepared by mixing the hydrogenated product with para-toluene sulfonic acid in a minimum amount of ethanol and precipitating the resultant salt with ether. The salt in an 81% yield, recrystallized from ethyl acetate and ethanol (95/5), is found to have a melting point of 116 to 118° C.

10 parts of the salt so formed is refluxed as a suspension in 100 parts of phosgene for 3 hours, following which 60 parts of chloroform are added and the phosgene removed. The product, the chloroformate of 4-(3-hydroxypropyl)-piperidine para-toluene sulfonate, upon recrystallization from benzene has a melting point of 118°–119° C. Polymerization is thereafter accomplished by adding a solution of 1 part of the chloroformate piperidine salt in 7 parts of methylene chloride to 200 parts of a vigorously stirred 1 molar aqueous solution of sodium carbonate maintained at a temperature of 6–7.° C. After 1 hour, the polymer is filtered, washed thoroughly and dried. A 98% yield of polymer having an inherent viscosity of 0.81 measured in meta-cresol at a concentration of 0.5% is obtained. The product is a rubbery amorphous material, soluble in a 15/85 mixture by volume of methanol and chloroform and also soluble in meta-cresol and in formic acid. It cannot be crystallized by heating at 100° C. or by boiling in water. Films cast from the methanol-chloroform solution are rubbery.

Example II 40 parts of 4-hydroxy-pyridine is hydrogenated in 160 parts of water, at 140° C. for 3 hours under a pressure of 1700 p.s.i. using 15 parts of carbon supported ruthenium (5% ruthenium). The paratoluene sulfonate salt, formed by mixing equimolar quantities of the 4-hydroxypiperidine and para-toluene sulfonic acid monohydrate in ethyl acetate solution, is phosgenated as taught in Example I, employing a contact period of 6 hours. The product is recrystallized from mixtures of benzene and cyclohexane yielding white needles with a a melting point of 117–120° C.

In the polymerization 1 part of the monomer in 7 parts of methylene chloride is added to 100 parts of 1 molar sodium carbonate solution maintained at 4–5° C. After a 1 hour reaction period, the polymer, with an inherent viscosity of 1.25, is obtained in a 62% yield. The addition of a small quantity of sodium fatty acid sulfate dispersing agent is observed to raise the viscosity of the polymer. The polymer is soluble in chloroform and methanol (85/15) from which it is cast as a tough, strong, soft, pliable, transparent amorphous film having a polymer melt temperature of 195–206° C. The film is drawn to 4.75 times its original length at 140° C. After drawing, the film has a polymer melt temperature of 250° C. and a crystalline melting point of 270° C.

The process of the present invention consists in contacting an acid acceptor and a solution of a compound of the formula

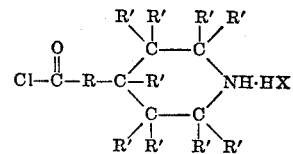

wherein —R— is a radical of the class consisting of —O— and —O-lower alkylene-, R' is a radical of the class consisting of —H and -lower alkyl and ·HX is an acid which forms a salt with a secondary amine. Preferably the radical —O-lower alkylene- recited above, contains no more than about 3 carbon atoms. The -lower alkyl radical may be -methyl, -ethyl, -propyl, -isopropyl or the like. The nature of the amine salt-forming acid is not critical. The hydrochloride, hydrobromide, sulfate, toluene sulfonate or the like may be used. The function of the acid group is to shield the amine to prevent its reaction with the chloroformate portion of the molecule until acid acceptor releases the amine. Thus the rate of addition of acid acceptor controls the rate of the reaction.

In addition to its function of releasing the amine for reaction, the acid acceptor acts to combine with hydrochloric acid released during the course of the reaction. To be effective in the process of the present invention, an acid acceptor is employed which is a stronger base than the piperidine starting material. In general, caustic alkali, alkali carbonate or other salt of a strong base and a weak acid or a tertiary organic base is suitable. The added acid acceptor may range from 2 to about 15 times the equivalent amount of the piperidine monomer. Preferably at least 3 equivalents of acid acceptor per equivalent of monomer is employed.

In contacting the monomer amine salt with acid acceptor, the monomer amine salt is dissolved in a non-aqueous inert solvent. Preferably the solvent is water-immiscible. Suitable solvents include chloroform, methylene chloride, carbon tetrachloride, benzene, toluene, xylene, chlorobenzene, cyclohexane, isooctane, diethyl ether and the like. Usually the acid acceptor is added as an aqueous solution so that when a water immiscible solvent is used for the monomer, an emulsion results. Rapid agitation and conventional emulsifying agents may be employed to improve emulsion of the discontinuous phase.

It is preferred that the reaction mass be cooled during the polymerization. A temperature between about 0° C. and 10° C. is generally desirable. However, a polymerization temperature as high as room temperature is suitable. While the optimum period for polymerization will vary somewhat depending upon the particular monomer, in general polymerization is complete in about 5 minutes. It is preferred that a polymerization period of at least about 20 minutes be employed. Longer periods, for instance up to 1½ hours, may be used.

Many equivalent modifications will be apparent to those skilled in the art from a reading of the above without a departure from the inventive concept.

What is claimed is:

1. A linear polyurethane consisting essentially of recurring structural units of the formula

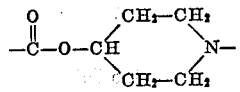

and having a polymer melt temperature of at least about 195° C.

2. A process for preparing a linear polyurethane which comprises contacting a mixture of an acid acceptor with a solution of a compound of the formula

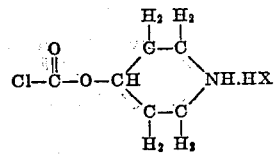

wherein HX is an acid which forms a salt with a secondary amine, said compound being essentially the sole polymer-forming ingredient therein, and said acid acceptor is a stronger base than 4-hydroxypiperidine.

References Cited in the file of this patent

UNITED STATES PATENTS 2,325,552    Schlack _____ July 27, 1943

FOREIGN PATENTS 913,823    Germany _____ June 21, 1954

OTHER REFERENCES

The Columbia Encyclopedia, page 1422, item "number, in arithmetic," second edition, 1950, by Columbia University Press, Morningside, N.Y. (Copy in Scientific Library.)

Emmert: "Chemical Abstracts," vol. 11, page 1260 (1917). (Copy in Scientific Library.)

Burtner et al.: "Chemical Abstracts," vol. 41, pages 5128–5129 (1947). (Copy in Scientific Library.)

UNITED STATES PATENT OFFICE
Certificate of Correction

Patent No. 2,915,505　　　　　　　　　　　　　　　　　　December 1, 1959

Franklin Howard Koontz et al.

It is hereby certified that error appears in the printed specification of the above numbered patent requiring correction and that the said Letters Patent should read as corrected below.

Column 1, lines 38 to 41, for that portion of the formula reading

 read column 2, line 61, for "R'" read — —R'—.

Signed and sealed this 21st day of June 1960.

[SEAL]

Attest:
KARL H. AXLINE,
*Attesting Officer.*

ROBERT C. WATSON,
*Commissioner of Patents.*